Feb. 22, 1938.   I. H. JUDD   2,108,968
TRUCK TRAILER COMBINATION
Original Filed Dec. 4, 1933   3 Sheets—Sheet 3
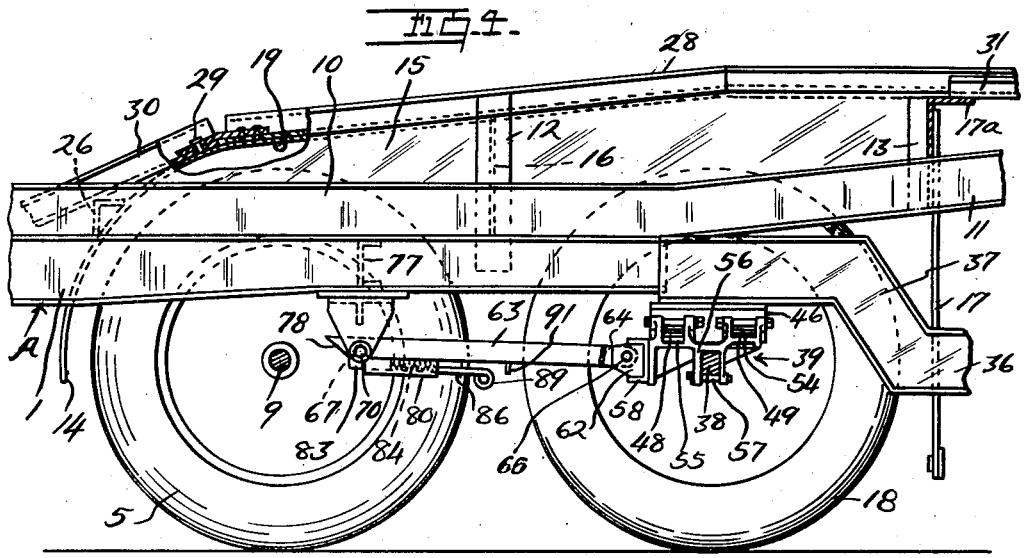
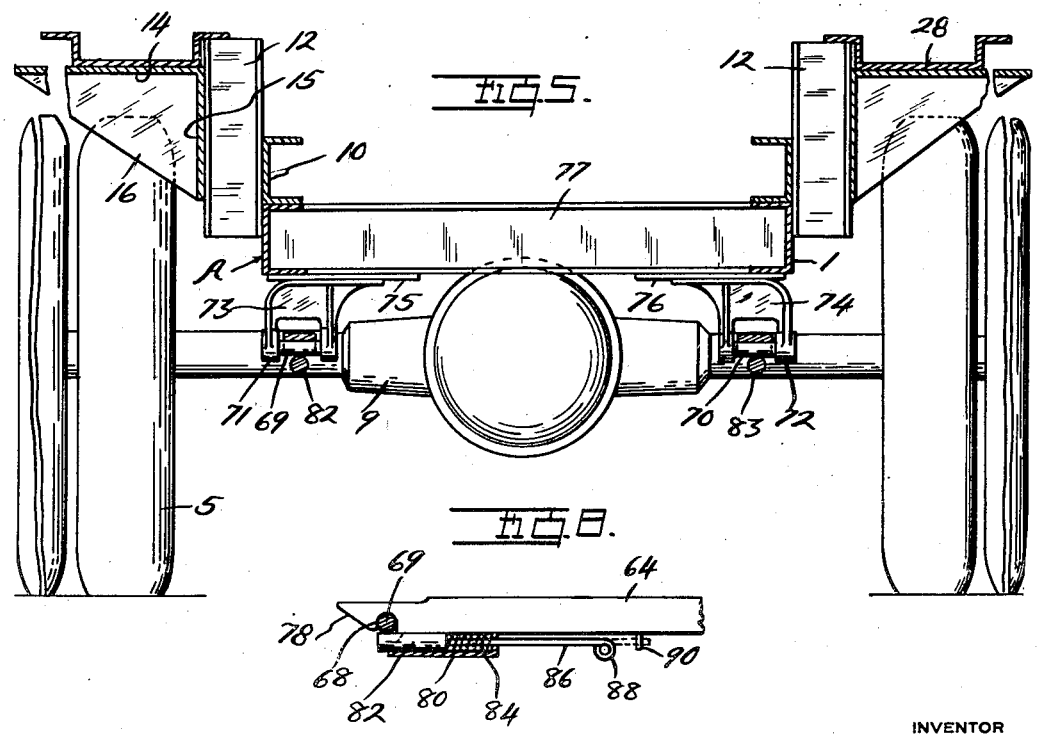
INVENTOR
Irving H. Judd Patented Feb. 22, 1938

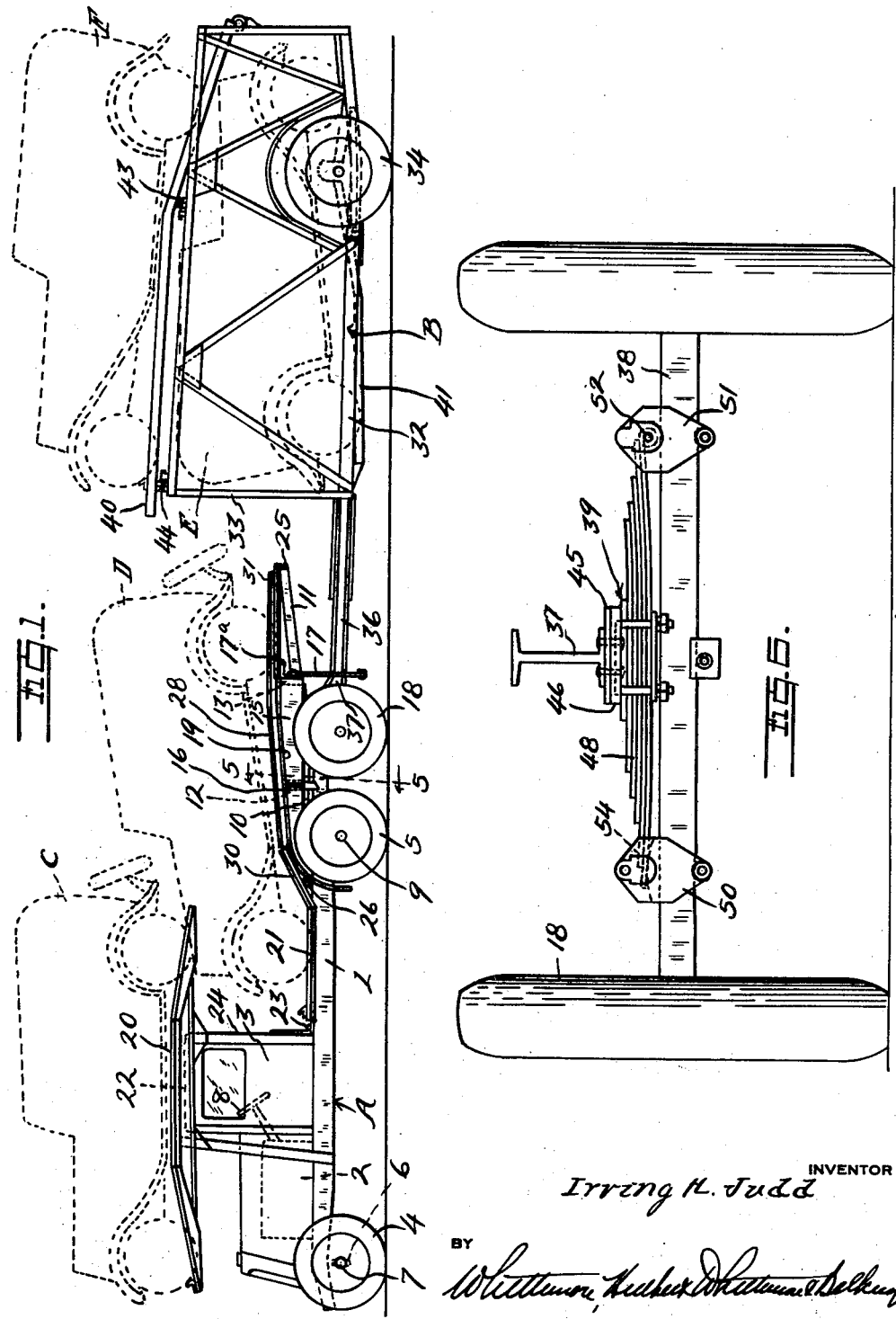

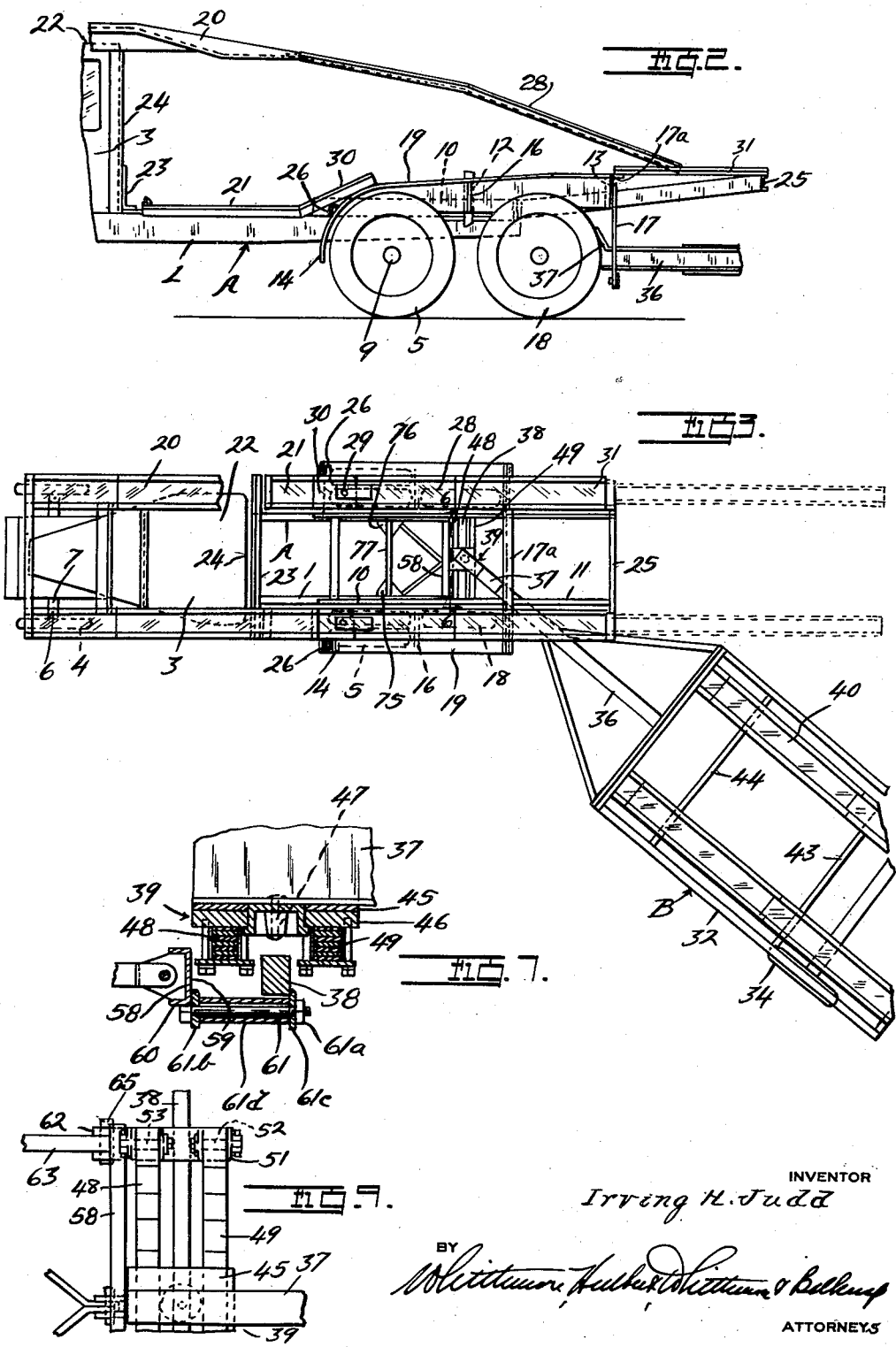

2,108,968

UNITED STATES PATENT OFFICE 2,108,968

TRUCK TRAILER COMBINATION

Irving H. Judd, Detroit, Mich., assignor to Whitehead & Kales Company, River Rouge, Mich., a corporation of Michigan Original application December 4, 1933, Serial No. 700,923. Divided and this application May 7, 1934, Serial No. 724,385

12 Claims. (Cl. 280—33.1)

This invention relates generally to means for transporting automobiles such as truck-trailer combinations and constitutes a division of my application filed December 4, 1933, bearing Serial No. 700,923.

One of the essential objects of the invention is to provide a truck-trailer combination wherein means on the truck for carrying automobiles extends rearwardly over a fifth wheel connection between the chassis frame and front axle of a four-wheel trailer and terminates adjacent the upright side frames on the trailer, whereby an automobile may span the connection, and substantially all available space in front of the frames may be utilized for automobile carrying purposes.

Another object is to provide a combination of the type mentioned wherein the draft connection between the truck and trailer is independent of the fifth wheel connection aforesaid.

Another object is to provide a truck-trailer combination wherein the automobile carrying means on the truck is so constructed and arranged that it may be loaded from the trailer or directly from the ground.

Another object is to provide a truck-trailer combination wherein means is provided within a given space for carrying longer wheel base automobiles.

Other objects, advantages and novel details of construction of this invention will be made more apparent as this description proceeds, especially when considered in connection with the accompanying drawings, wherein:

Figure 1 is a side elevation of a truck-trailer combination embodying my invention;

Figure 2 is a fragmentary elevation of the combination illustrated in Figure 1 with the portion 28 of the lower track inclined upwardly and connected to the rear end of the upper track 20;

Figure 3 is a top plan view of the combination when the truck is "jackknifed" relative to the trailer and is provided with skids so that automobiles may be loaded onto the truck without moving longitudinally of the trailer;

Figure 4 is an enlarged fragmentary vertical sectional view through the truck-trailer combination with parts broken away and in section;

Figure 5 is a sectional view taken substantially on the line 5—5 of Figure 1;

Figure 6 is a transverse sectional view taken substantially on the line 6—6 of Figure 3;

Figure 7 is an enlarged vertical sectional view through the fifth wheel assembly and associated parts;

Figure 8 is a fragmentary elevation of one of the draw bars and associated latch mechanism showing one of the pins 69 in operative latched position;

Figure 9 is a plan view of a portion of Figure 3 with parts broken away.

Referring now to the drawings, A is the truck and B is the trailer of a combination embodying my invention. As shown, the truck A has a chassis frame 1 carrying an engine 2 and a driver's cab 3 and provided with front and rear ground-engaging wheels 4 and 5 respectively. As usual, the front wheels 4 are mounted on spindles 6 pivotally connected to the front axle 7 and operable from a suitable steering wheel 8 within the cab. The rear wheels 5 are preferably arranged in pairs at opposite ends of the rear axle 9 and are adapted to be driven in the usual way from the engine 2.

10 is an auxiliary frame mounted on and having a portion 11 inclining upwardly and rearwardly from the chassis frame 1. 12 and 13 respectively are uprights rigid with and projecting above the auxiliary frame 10, 14 are wheel fenders disposed upon the outer sides of and having depending portions 15 rigid with the uprights 12 and 13, and 16 are reinforcing gussets for the fenders. In this connection it will be noted that the fenders 14 are elongated in form so as to cover the front wheels 18 of the trailer as well as the rear wheels 5 of the truck, the rear end portions 17 of said fenders being formed of flexible or yieldable material such as rubber, rubber composition or weighted canvas and normally hanging in a vertical plane from an angle cross-bar 17a rigid with the top portions 19 of said fenders. Thus, the flexible portions 17 will afford clearance when the trailer is being coupled or uncoupled. Moreover, the tops 19 of such fenders are slightly inclined as shown instead of being curved longitudinally.

Preferably the truck A is designed to carry two automobiles and for this purpose is provided with upper and lower tracks 20 and 21 respectively. As shown, the upper track 20 is mounted on and extends forwardly and rearwardly beyond the top 22 of the cab, while the lower track 21 is mounted on and extends forwardly and rearwardly beyond the inclined portions 19 of the wheel fenders. The upper track 20 is preferably of sufficient length to carry a 119" wheel base automobile C while the lower track 21 is sufficiently long to carry a 136" wheel base automobile D. In this connection it will be noted that the upper and lower tracks 20 and 21 are staggeredly arranged and that the lower track 21 extends from an angle iron 23 that crosses the chassis frame 1 at the back 24 of the cab to a channel crossbar 25 at the rear end of the auxiliary frame 10. Angle irons 26 project laterally from the auxiliary frame 10 in advance of the fenders 14 and cooperate with the angle iron 23 to support the track 21, while the angle bar 17a cooperates with the crossbar 25 to support the track. To facilitate loading of the upper track 20, an intermediate portion 28 of the lower track 21 is used as a skid between the tracks 21 and 20. Normally, this portion 28 is bolted at 29 to the inclined portion 30 of the lower track and is nested in the rear portion 31 of said track. However, when it is desired to load or unload the upper track 20, the portion 28 is detached from the inclined portion 30 of the lower track and is fastened to the rear end of the upper track, as illustrated in Figure 2.

The trailer B has a chassis frame 32 carrying upright side frames 33 and provided with front and rear ground-engaging wheels 18 and 34 respectively. Preferably, the chassis frame 32 at the forward ends of the upright side frames is Y-shaped in plan and the stem 36 of the Y has an upwardly offset portion 37 at its forward end extending over and connected to the front axle 38 of the trailer by a fifth wheel 39. The trailer B also carries two automobiles and for this purpose has upper and lower tracks 40 and 41 respectively which may be loaded by skids (not shown) from the ground. Preferably the lower track 41 is carried by the chassis frame 32 between the upright side frames 33 and is sufficiently long to carry a 130" wheel base automobile E, while the upper track 40 is carried by hingedly mounted crossbars 43 and 44 respectively on the side frames 33 and is sufficiently long to carry a 136" wheel base automobile F.

Preferably the upper plate 45 of the fifth wheel 39 is rigid with the offset portion 37 of the frame, while the lower plate 46 of said fifth wheel is connected to the upper plate 45 by a king pin 47 and is rigid with the centers of transversely extending leaf springs 48 and 49 respectively, terminally engaging suitable brackets 50 and 51 respectively rigid with the front axle 38 of the trailer. As shown, the springs 48 and 49 are fastened by bolts 52 and 53 respectively to the brackets 51 and have slip engagement with suitable slots 54 and 55 respectively in the brackets 50. Preferably both brackets 50 and 51 have inverted U-shaped portions 56 straddling the axle 38 and fastened thereto by bolts 57.

58 is a channel crossbar in advance of the brackets 50 and 51 and disposed parallel to the axle 38. Preferably the base 59 of the channel 58 bears against and is secured to the front faces of the brackets 50 and 51, while the lower side 60 of said crossbar is connected to the axle 38 by a bolt 61 and nut 61a, suitable brackets 61b and 61c being welded to the crossbar 58 and axle 38 respectively and receiving said bolt. A tube 61d is sleeved upon the bolt 61 between said brackets and serves as a spacer.

62 are parallel plates secured in the channel crossbar 58 at opposite ends thereof, 63 and 64 respectively are parallel draw bars connected by horizontal pivot pins 65 and 66 respectively to said parallel plates 62 and having transversely extending slots 67 and 68 respectively therein at their forward ends for receiving horizontal pins 69 and 70 respectively carried by bifurcated portions 71 and 72 respectively of brackets 73 and 74 respectively rigid with gussets 75 and 76 respectively welded to the crossbar 77 of the chassis frame 1 of the truck. As shown, the draw bars 63 and 64 are movable forwardly and rearwardly in the bifurcated portions 71 and 72 over the pins 69 and 70 and have beveled faces 78 to facilitate engagement with and removal from the pins. Bosses 80 respectively are fixed to the undersides of the draw bars 63 and 64 and contain large bolts or plungers 82 and 83 respectively which are normally held forwardly across the slots 67 and 68 by coil springs 84 and are retractable by manually operable pull rods 86. Preferably these pull rods 86 are swivelly connected to the latch bolts 82 and 83 so that they may be turned ninety degrees and have eyes 88 and 89 respectively at their rear ends that may be engaged with pins 90 and 91 respectively projecting downwardly from the draw bars 63 and 64 when it is desired to retain the latch bolts 82 and 83 in retracted position.

When loading the combination, the trailer B may be in alignment with the truck A as illustrated in Figure 1 or the truck A may be "jackknifed", i. e., turned at an angle relative to the trailer B as illustrated in Figure 3. When the parts are in alignment, the combination is loaded by first swinging the upper track 40 of the trailer upwardly over one upright side frame 33 to an inoperative position for clearance purposes and then driving automobile C from the ground up skids (not shown) attached to the rear end of the trailer over track 41 between the upright side frames 33 up skids (not shown) onto track 21 on the truck, then up track section 28 (Figure 2) onto track 20. Track section 28 is then returned to nested position with section 31 of track 21. Automobile D is then driven from the ground up the skids attached to the rear end of the trailer B over track 41 between the upright side frames 33 up skids onto track 21 beneath the rear end of automobile C (Figure 1). Automobile E is then driven from the ground up skids onto track 41. The track 40 is then returned to lowered operative position (Figure 1), and finally automobile F is driven from the ground up skids (not shown) onto said track 40. When the truck A is "jackknifed" (Figure 3), then automobiles C and D are driven from the ground up skids 31a onto the tracks 30 and 21 respectively without moving over track 41 between the upright side frames 33 of the trailer. Thus, larger automobiles having a greater over-all width than the distance between the upright side frames 33 may be loaded onto tracks 20 and 21 when the truck is "jackknifed" as aforesaid.

What I claim as my invention is:

1. A truck-trailer combination comprising a trailer provided with a chassis frame, transversely extending axles at the forward and rear ends of said frame, a fifth wheel connection between said chassis frame and the forward axle, automobile carrying means on the chassis frame in rear of the fifth wheel connection, and a draft vehicle for the trailer connected thereto and having automobile carrying means extending over the fifth wheel connection to a point adjacent the automobile carrying means on the trailer and constructed in such a way that it may be loaded from the automobile carrying means on the trailer or from the ground.

2. A truck-trailer combination comprising a trailer having a chassis frame, transversely extending axles at the forward and rear ends of said frame, a fifth wheel connection between said chassis frame and the forward axle, automobile carrying means on the chassis frame in rear of the forward axle and extending over the rear axle, and a draft vehicle for the trailer connected thereto independently of the fifth wheel connection aforesaid and having automobile carrying means extending over the fifth wheel connection and terminating adjacent the automobile carrying means aforesaid on the trailer.

3. A truck-trailer combination comprising a trailer having a chassis frame, transversely extending axles at the forward and rear ends of said frame, a fifth wheel connection between said frame and the forward axle, automobile carrying means carried by the chassis frame and extending over one of said axles, and a draft vehicle for the trailer connected thereto independently of the fifth wheel connection and having a frame extending over said fifth wheel connection and materially overlapping the chassis frame of the trailer, and automobile carrying means carried by the last mentioned frame and constructed and arranged in such a way that an automobile carried thereby may span the fifth wheel connection and materially overlap the trailer.

4. A truck-trailer combination comprising a trailer having a chassis frame, transversely extending axles at the forward and rear ends of said frame, a fifth wheel connection between the chassis frame and the forward axle, upright side frames on the chassis frame in rear of the fifth wheel connection, automobile carrying means on the chassis frame between the upright side frames, and a truck connected to said trailer independently of the fifth wheel connection and having automobile carrying means extending rearwardly over said fifth wheel connection and terminating in close proximity to the upright frames whereby substantially all available space at the front of the upright frames on the trailer may be utilized for automobile carrying purposes, the automobile carrying means on the trailer and truck being so constructed and arranged that an automobile may be driven from one of said means to the other, and the connection between said truck and trailer being such that the truck may be so positioned relative to the trailer that an automobile may be driven from the ground onto the automobile carrying means on the truck without passing over the automobile carrying means on the trailer.

5. A truck-trailer combination comprising a trailer having a chassis frame, transversely extending axles at the forward and rear ends of said frame, a fifth wheel connection between the chassis frame and the forward axle, upright side frames on the chassis frame in rear of the fifth wheel connection, an automobile track on the chassis frame between the upright side frames, and a truck connected to the trailer independently of the fifth wheel connection and having a frame extending rearwardly over said fifth wheel connection and materially overlapping the chassis frame of the trailer, and an automobile track carried by the last mentioned frame and terminating in close proximity to the upright frames on the trailer whereby substantially all available space at the front of the upright frames on the trailer may be utilized for automobile carrying purposes.

6. A truck-trailer combination comprising a trailer provided with a chassis frame, transversely extending axles at the forward and rear ends of said frame, the axle at the forward end of said frame being movable relative thereto, automobile carrying means on the chassis frame in rear of the axle at the forward end of said frame, and a draft vehicle for the trailer connected thereto and having automobile carrying means extending over the axle at the forward end of the trailer to a point adjacent the automobile carrying means on the trailer and constructed in such a way that it may be loaded from the automobile carrying means on the trailer or from the ground.

7. A truck-trailer combination comprising a trailer having a chassis frame provided with front and rear axles having ground-engaging wheels, the front axle being movable relative to said chassis frame, automobile carrying means on the chassis frame in rear of the front axle and extending over the rear axle, a draft vehicle for the trailer having a chassis frame provided with front and rear axles having ground-engaging wheels, and a connection between the chassis frames of said draft vehicle and trailer constantly maintaining the front axle of the trailer substantially parallel to the rear axle of the truck, a portion of said draft vehicle extending over said connection and over the front axle of the trailer independently of the latter and having automobile carrying means capable of being loaded from the automobile carrying means on the trailer or from the ground.

8. A truck-trailer combination comprising a trailer having a chassis frame, upper and lower automobile carrying tracks carried by said frame, front and rear supporting axles provided with ground wheels, the rear axle extending transversely of the lower track, the front axle being in advance of said lower track, a portion of the frame projecting forwardly in advance of the lower track and having a portion overlying the front axle, a fifth wheel connection between said frame and front axle, and a tractor for the trailer connected thereto independently of the fifth wheel connection and having automobile carrying means extending rearwardly over said fifth wheel and frame aforesaid to a point adjacent the forward ends of said tracks on the trailer.

9. A truck-trailer combination, comprising a trailer having a chassis frame, vertically spaced substantially horizontal tracks for automobiles supported on said chassis frame at the rear end thereof, the portion of the chassis frame in advance of said tracks being substantially Y-shape in plan, front and rear axles provided with ground wheels, the rear axle being connected to said chassis frame adjacent the rear end of said lower track, the front axle being adjacent the forward end of the stem of said Y-shaped portion, a fifth wheel connection between said stem and front axle, and a tractor for the trailer connected thereto independently of the fifth wheel connection and having automobile carrying means extending rearwardly over said fifth wheel connection and Y-shaped portion of the chassis frame to a point adjacent the forward ends of said tracks.

10. A truck-trailer combination, comprising a trailer having a chassis frame, automobile carrying means supported on said chassis frame at the rear end thereof, the portion of the chassis frame in advance of said automobile carrying means being substantially Y-shaped in plan, front and rear axles provided with ground wheels, the rear axle being connected to said chassis frame adjacent the rear end of said automobile carrying means, the front axle being adjacent the forward end of the stem of said Y-shaped portion, a fifth wheel connection between said stem and front axle, and a tractor connected to the front axle of the trailer and having automobile carrying means above said fifth wheel connection and extending rearwardly over the Y-shaped portion of the chassis frame to a point adjacent the automobile carrying means on the trailer.

11. A truck-trailer combination, comprising a trailer having a chassis frame, an automobile track extending longitudinally of said frame at the rear end thereof, front and rear supporting axles provided with ground wheels, the rear axle being connected to said frame adjacent the rear end of said track, the front axle being in advance of said track, a fifth wheel connection between said frame and front axle, and a tractor for the trailer connected thereto independently of the fifth wheel connection and having automobile carrying means extending rearwardly over said fifth wheel to a point adjacent the forward end of said track on the trailer.

12. A truck-trailer combination, comprising a trailer having a chassis frame, automobile carrying means supported on said frame, a portion of said frame projecting forwardly in advance of said automobile carrying means, front and rear axles provided with ground wheels, the rear axle being connected to said frame adjacent the rear end of said automobile carrying means, the front axle being at the forward end of the forwardly projecting portion of said frame, a fifth wheel connection between said front axle and the forwardly projecting portion of said frame, a tractor for the trailer having automobile carrying means above said fifth wheel connection and extending rearwardly over the forwardly projecting portion of said frame to a point adjacent the automobile carrying means on the trailer, and a draft connection between the tractor and trailer independent of the fifth wheel connection aforesaid.

IRVING H. JUDD.